Sept. 15, 1964 M. C. GRAY ETAL 3,148,486
GUIDE AND DEPTH GAUGE FOR COMBINATION
PORTABLE GRINDERS AND DRESSERS
Filed Oct. 8, 1962 5 Sheets-Sheet 4
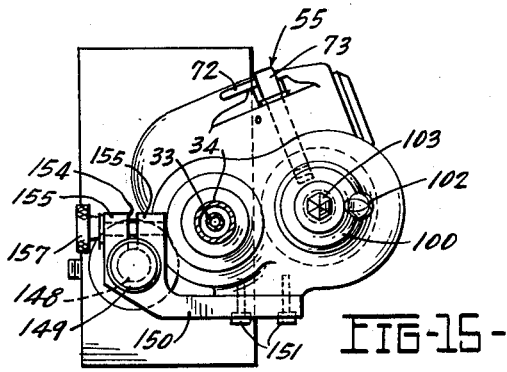
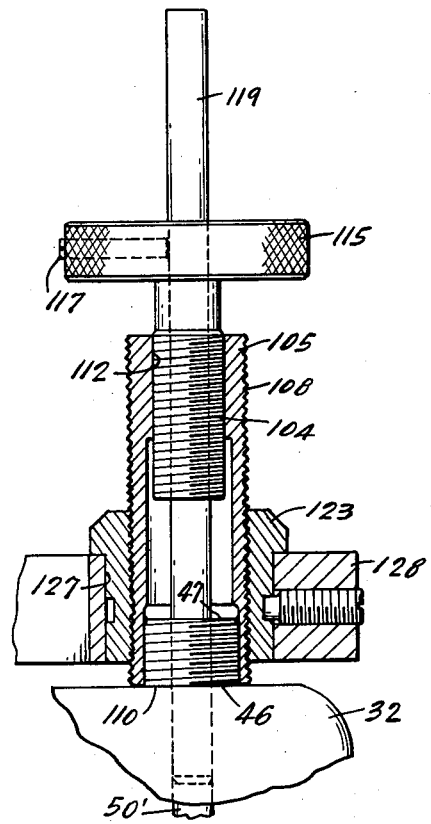
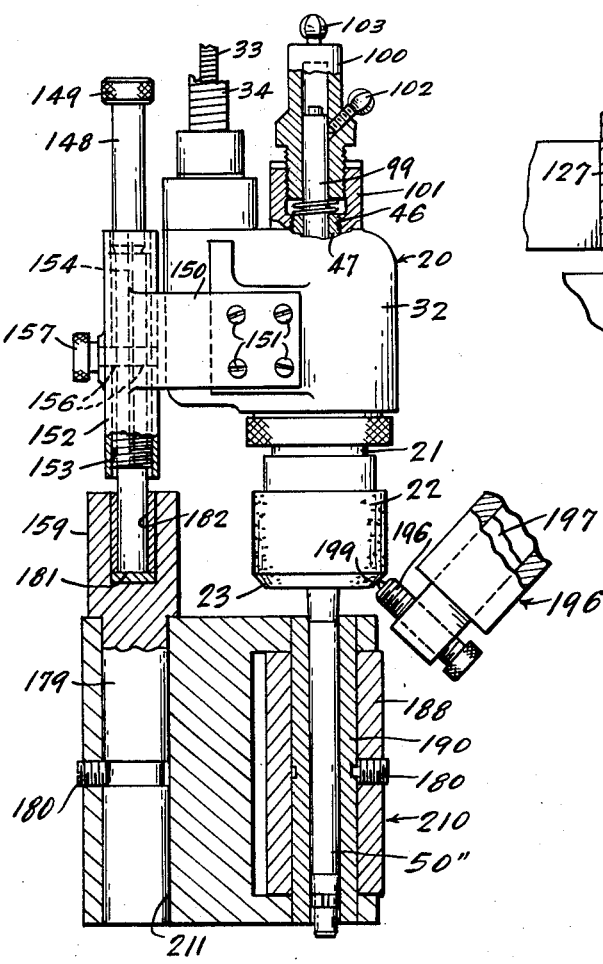
INVENTORS:
MILO C. GRAY, PAUL H. PETH.
JOSEPH I. POPE.
BY
Hugh A Kirk
ATT'Y.

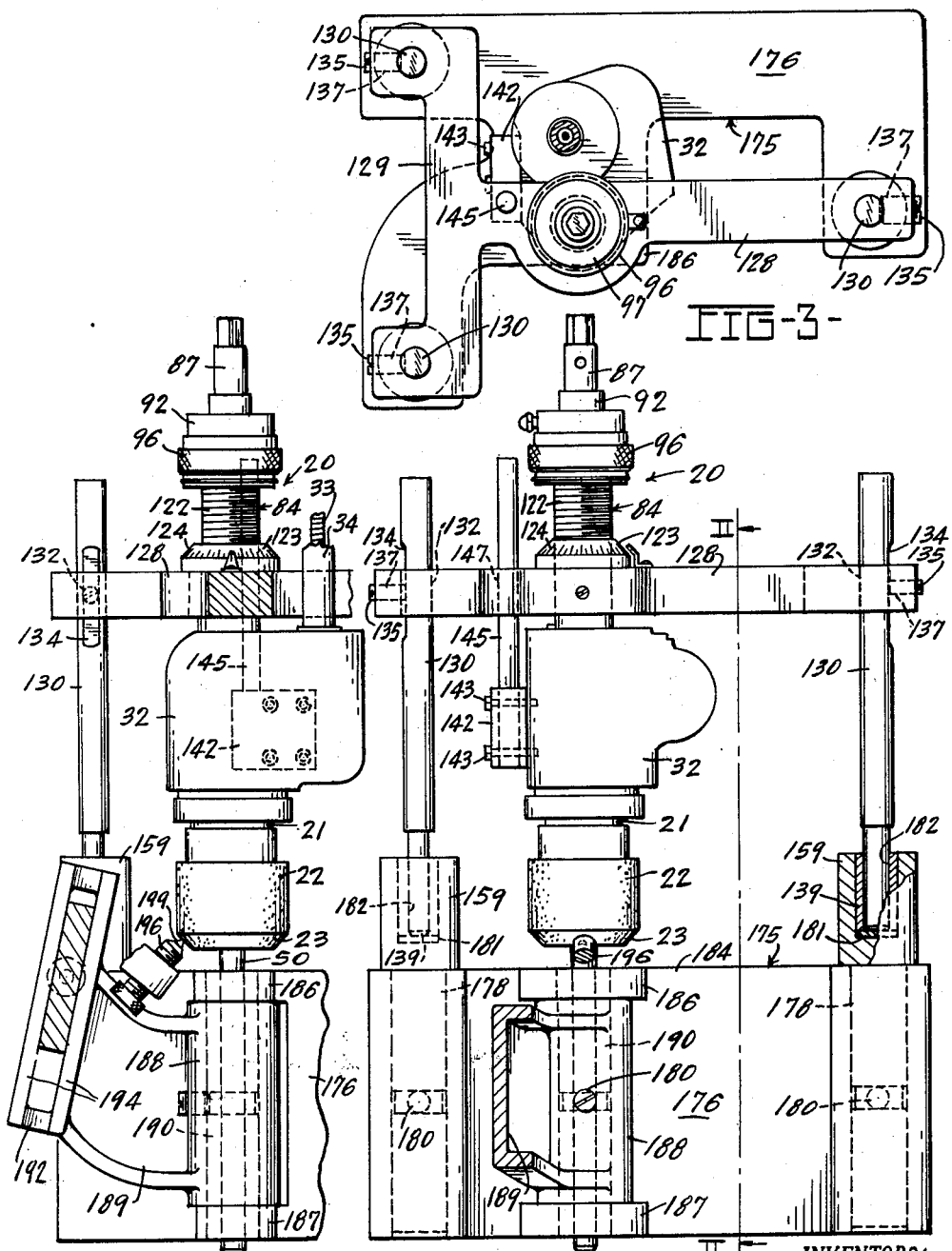

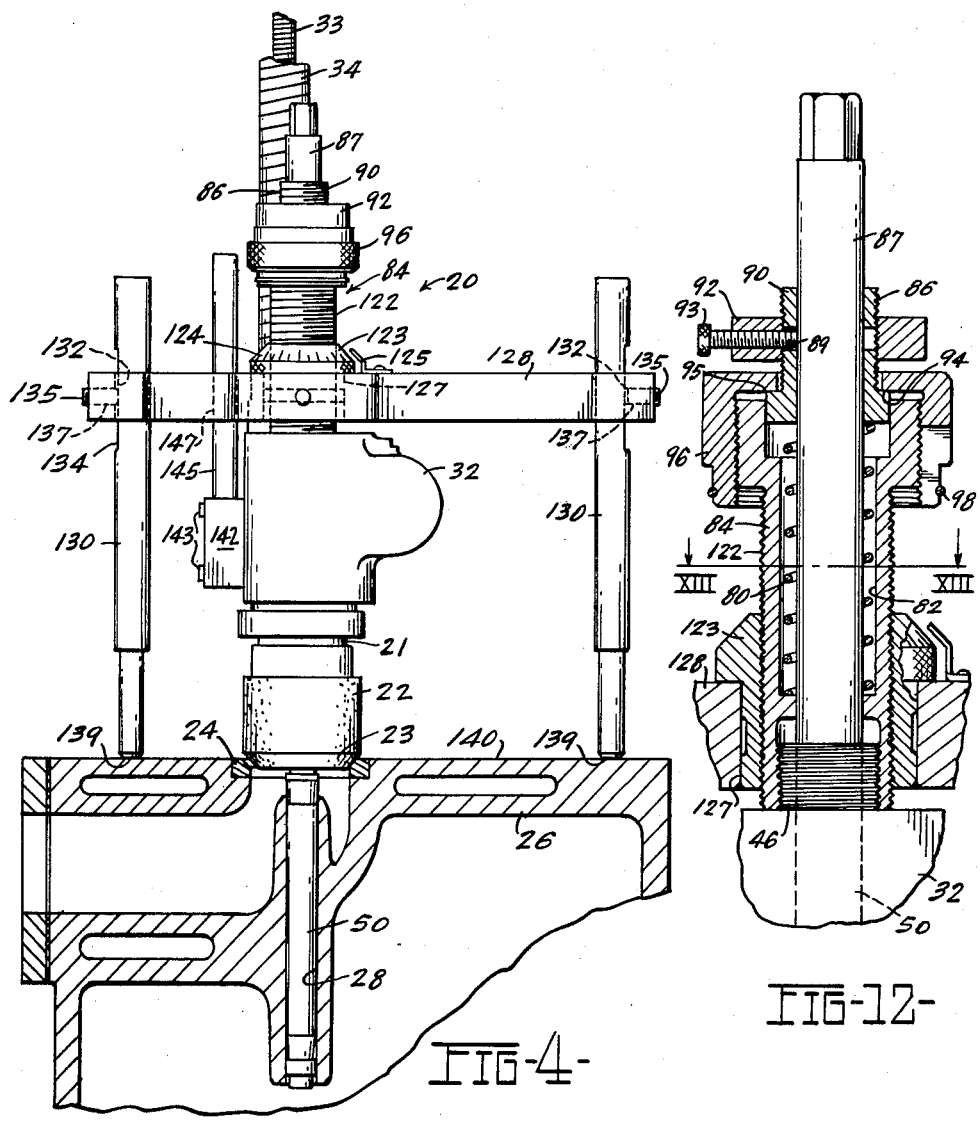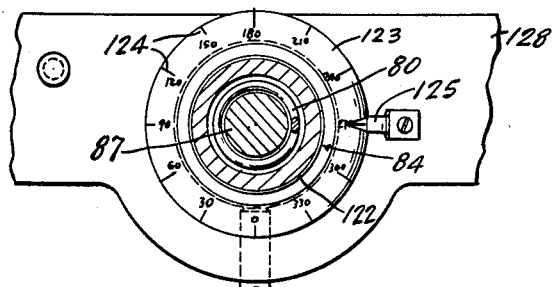

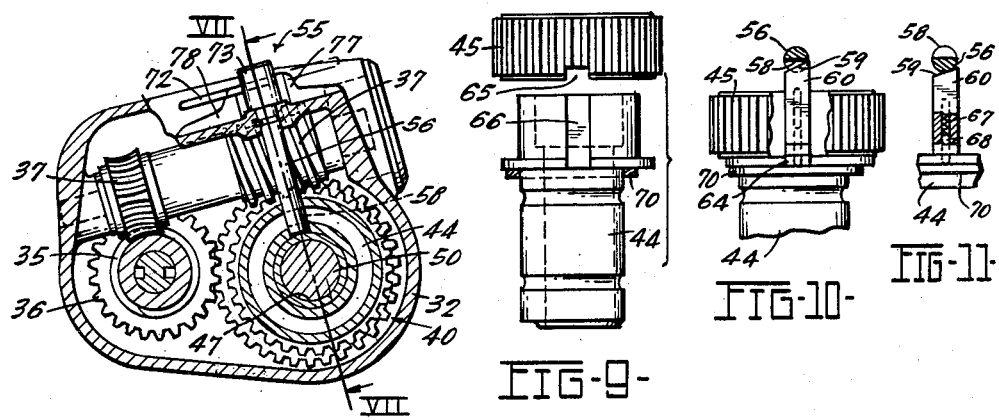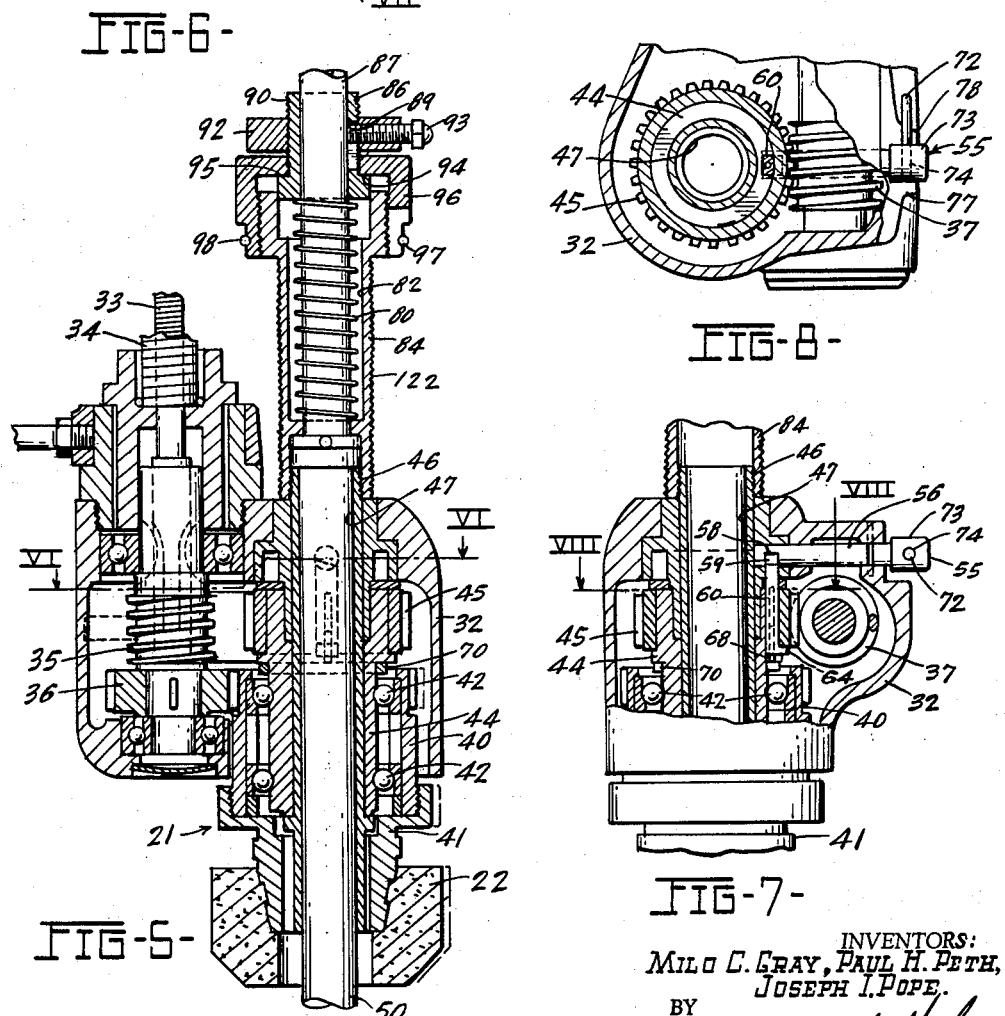

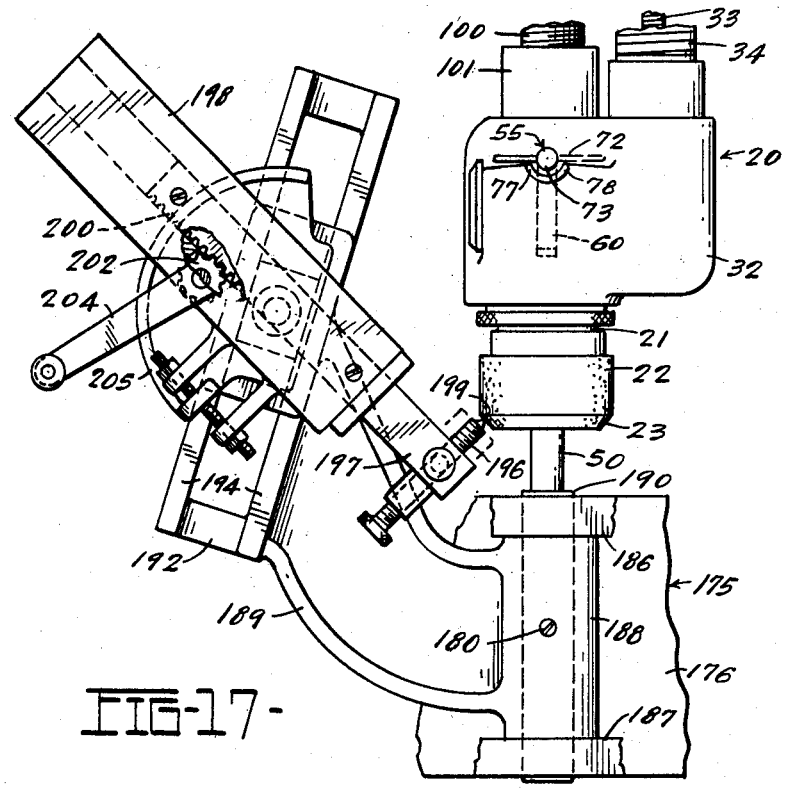
FIG-17-
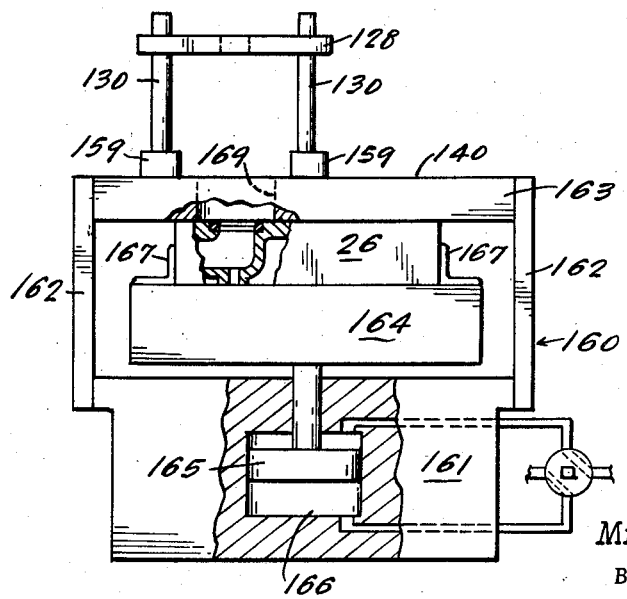
FIG-18-
INVENTORS:
MILO C. GRAY. PAUL H. PETH.
JOSEPH I. POPE.
BY
Hugh A Kirk
ATT'Y.

United States Patent Office 3,148,486
Patented Sept. 15, 1964

3,148,486
GUIDE AND DEPTH GAUGE FOR COMBINATION PORTABLE GRINDERS AND DRESSERS
Milo C. Gray and Joseph I. Pope, Toledo, Ohio, and Paul H. Peth, Erie, Mich., assignors to Hall-Toledo, Inc., Toledo, Ohio, a corporation of Ohio
Filed Oct. 8, 1962, Ser. No. 228,802
16 Claims. (Cl. 51—170)

This invention relates to portable grinding machines and is particularly directed to means for guiding and limiting the position of the grinding wheel of such a machine so that its grinding surface is maintained at the same relative position with respect to a stop or gauging surface during both grinding and dressing operations of the machine. Such portable grinders are employed for grinding the valve seats in the blocks or heads of internal combustion engines.

It is an object of this invention to provide a new, simple, efficient, effective and economic guide and gauge means for a portable grinding machine, which gauges the depth of a cut for the machine with respect to a predetermined gauging point or surface, which gauging means in cooperation with the gauging surface steadies the feed of the grinding wheel and determines the relocation of the grinding wheel with respect to the work after the wheel has been dressed.

Another object is to provide a jig for dressing such a grinding wheel, which jig has a gauging surface and a dressing tool with the same relative depth spacing between them as between the gauging surface adjacent the work being ground and the surface on the work to which the grinder is to grind or cut.

Another object is to provide a gauge and guide means that can be attached to portable grinders of various types so that the grinding wheel can be positioned for dressing and grinding with a minimum of adjustment from one to the other.

Another object is to provide such a gauging means for a grinding tool which also guides and stabilizes the cutting tool both while operating on the work and while dressing it in the jig.

Another object is to provide such a gauge and guide means which is adjustable to predetermine the amount of material removed from the grinder during dressing so as to maintain a constant distance between the cutting surface of the grinder and the abutting or gauging surface of the depth gauging means.

Still another object of this invention is to provide a gauge and guide means for grinders with adjustable stop rod means as well as micrometer adjustment means to control the depth of the dressing operation and gauge the relocation of the stop means.

Still a further object is to provide such a gauge and guide means also for portable automatic preset force feed grinders of the type disclosed in Gray et al. U.S. Patent No. 2,977,727, issued April 4, 1961.

Generally speaking, the structure to which the guiding and gauging device of this invention is attached, comprises a grinding tool which preferably is portable relative to the work to be ground and a dresser including a jig therefor, which tool may comprise a gear housing, a rotating grinding wheel, a pilot for guiding the grinding wheel, and a driving connection to the housing for rotating the grinding wheel. Also the grinding wheel may be driven by a flexible shaft to the housing and may be mounted for eccentric or planetary motion about a pilot, which pilot may be locked into the piece of work to be ground, such as in the guide stem of a valve for grinding a valve seat on a cylinder block or head. If the grinder is eccentrically driven, means should be provided for locking the grinder for only rotation during the dressing operation. The grinder may be fed toward the work piece by gravity or through a force feeding mechanism which may be anchored to the pilot for the grinding tool.

The guide and gauge means of this invention is attached to and projects from the gear housing for the grinding tool. To the end of this attached means, or opposite ends thereof on each side of the housing, there may be provided one or more adjustable stop rods or pins parallel to the spindle of the grinder, which stops locate to a gauging surface either on the work or a jig for the work, and also on the jig for dressing the grinder. Thus the distance between the cutting surface of the grinding wheel and the end of the stop rod which contacts the gauging surfaces is maintained constant regardless of how much material is removed from the grinding wheel during the dressing operation. By providing a plurality of stop rods on adjacent surfaces the tool is steadied in its grinding operation and if desired predetermined sockets may be provided on the jig for the work into which the stop rods fit for further guiding and stabilizing the operation of the tool. Also to prevent any oscillation of the tool about its connection to the attached gauging means, there may be provided an anti-torque means or slidable rod in the base or bar portion thereof which mounts the stop rod or rods. A threaded sleeve or depth adjustment nut with a calibrated flange or boss may be provided for adjusting the gauge and guide means axially with respect to the tool.

The above mentioned and other features and objects of this invention and the manner of attaining them will become more apparent and the invention itself will be best understood by reference to the following description of the embodiments of the invention taken in conjunction with the accompanying drawings, wherein:

FIG. 1 is a front elevation of one embodiment of the guide and gauge means of the present invention with a part broken away, shown in grinding wheel dressing position in a form of dressing fixture or jig capable of locating the grinding surface in predetermined position with respect to a stop means;

FIG. 2 is a side elevation of the guide and gauge means taken along line II—II in FIG. 1;

FIG. 3 is a plan view of another embodiment of a tripod type of guide and gauge means similar to the means shown in FIGS. 1 and 2;

FIG. 4 is a front elevation of the guide and gauge means of FIG 1 in position on a cylinder head in vertical section, to grind a valve seat thereon and gauge its depth by the surface of the cylinder head;

FIG. 5 is a vertical sectional view of a portable grinder incorporating a force feed mechanism operable on the grinding wheel and illustrating the gearing for providing both rotation and gyration to the grinding wheel;

FIG. 6 is a sectional detail view taken along line VI—VI in FIG. 5, showing an eccentric release means to stop the gyratory motion of the grinding wheel;

FIG. 7 is a fragmentary sectional detail view taken along the line VII—VII in FIG. 6;

FIG. 8 is a fragmentary sectional detail view taken along line VIII—VIII of FIG. 7;

FIG. 9 is an exploded side elevational view of the eccentric drive sleeve and gear shown in section in FIG. 5;

FIG. 10 is a fragementary side elevation of the sleeve and gear assembly of FIG. 9 with a portion broken away to show the means for locking the parts together;

FIG. 11 is a detail view of the locking means of FIG. 10;

FIG. 12 is an enlarged fragmentary vertical sectional detail view of the force feed mechanism for a grinding wheel of the type shown in FIGS. 1, 2 and 4;

FIG. 13 is an enlarged fragmentary detail view taken along lines XIII—XIII in FIG. 12, of the depth adjustment nut illustrating a micrometer scale and pointer thereon;

FIG. 14 is a side elevation of another embodiment of the guide and gauge means of this invention associated with a jig on the dresser, in grinding wheel dressing position, and having a single adjustable stop rod and socket therefor;

FIG. 15 is a top plan view of the guide and gauge means disclosed in FIG. 14;

FIG. 16 is an enlarged view similar to FIG. 12 but illustrating a gravity feed mechanism for a grinding wheel;

FIG. 17 is a side elevation of a dressing fixture or jig capable of receiving a grinder in the desired position for dressing the grinding wheel; and FIG. 18 is a somewhat diagrammatic elevation of a fixture for receiving a work piece and incorporating a gauging surface for locating a guide and depth gauge means according to FIGS. 1, 2 and 4 of this invention.

(I) The Grinder

Referring to FIGS. 1, 2 and 4 of the drawings, which illustrate one embodiment of the guide and gauge means of the present invention, there is shown a grinding tool 20 on a spindle 21 which may be of the type known as an eccentric valve seat grinder. This grinder is inclusive of a rapidly rotating bevelled annular shaped grinding or cutting stone 22 having a cutting surface 23, which also and more slowly gyrates eccentrically so as to cut only one place at a time around the valve seat insert 24 (see FIG. 4) in the head or block 26 of an internal combustion engine; the block further including valve guide 28.

More specifically, the grinder 20 may be of the type shown in the Milo C. Gray et al. United States Patent No. 2,977,727, issued April 4, 1961, or of the type shown in FIGS. 5 through 11 herein, which are further inclusive of a force feed mechanism for applying a positive axial pressure to the grinding wheel 22. In such grinders, both the faster rotation and slower gyration of the wheel 22 is produced in a single gear housing 32 of the grinding head to which may be connected a flexible shaft 33 in a sheath 34 connected to a rotating power source (not shown). Shaft 33 may drive both a spur gear 36 and a worm gear 35 (see FIGS. 5 and 6) driving a worm 37 journalled in the housing 32. The spur gear 36 rotates the grinding tool 22 through its deep intermeshing teeth with a gyrating gear sleeve 40, to the outer projecting lower end 41 of which the cutting tool or stone 22 may be releasably attached for replacement, such as after wear or for different contoured working surfaces. This fast rotating and gyrating sleeve gear assembly 40 and 41 may be journalled in a pair of ball bearings 42 on an eccentric driven sleeve 44, on the upper end of which a gear 45 is mounted to be driven by the worm 37. This slower worm drive of the eccentric sleeve 44 causes the gyratory movement of the grinding tool 22. Through the center of the eccentric sleeve 44 is a tubular guide sleeve 47 which may be stationary and anchored to the housing 32, and through which guide sleeve 47 stationary pilot 50 extends and accurately fits for steadying the grinding head during its rotating and gyrating movements. It is to the upper end of this fixed guide sleeve that the force feed mechanism described later may be attached through external screw threads 46 on said sleeve 47. While such or similar pilot guides 50 lend considerable support to the grinder 20 during grinding operations, the guide and gauge means of the present invention greatly improves the results obtained in using these grinders.

As shown in detail in FIGS. 5 through 11, means are provided to release the eccentric drive for purposes of rotating the wheel 22 on a fixed axis so that, for example, the wheel 22 may be dressed as later described. Such means may include a key 55 having a shank portion 56 extending into the casing 32 and terminating above gear 45. The inner end of shank 56 is transversely slotted at 58 to receive the upper diagonal end 59 of a vertically disposed key 60 disposed in a slot 62 in sleeve 44. Key 60 has an outwardly disposed projection or foot portion 64 engageable with a notch 65 (see FIG. 9) in the lower edge of gear 45; foot 64 being normally urged into the notch 65 by a spring 67 pressed pin 68. The spring 67 and pin 68 are received in a bore in the key 60 and the outer end of pin 68 bears against lock washer 70. Stop means in the form of a pin 72 may be provided in the outer enlarged end 73 of key 55. Pin 72 is slideable in an aperture 74 in the end 73 so as to be moved toward opposite stops 77 or 78 (see also FIG. 17) formed in casing 32. Thus, when pin 72 is rocked into engagement with one stop, such as stop 78 the key 60 is in position to lock gear 45 and sleeve 44 together (see FIG. 10). When pin 72 is moved in the opposite direction into engagement with opposite stop 77, key 60 is forced downwardly to disengage key foot 64 from the gear 45 (see FIG. 11) and release the driving connection between gear 45 and sleeve 44 permitting rotation of the spindle 21, and thus wheel 22 without causing the gyration thereof. When pin 72 has been moved toward either stop 77 or 78 it may be moved longitudinally into engagement with the opposite stop to hold key 55 in such position.

Referring now to FIGS. 5 and 12, the automatic force feed mechanism is shown as including a helical compression spring 80 positioned within a central annular chamber 82 in a sleeve 84, which spring 80 reacts between the lower end of chamber 82, or the housing 32, and a pilot anchored sleeve 86 which may be clamped along the upper extension 87 of pilot 50. Sleeve 86 is provided with one or more slots or apertures 89 and is externally threaded at 90 to receive a cutting depth limiting ring nut 92 provided with a set screw 93 capable of being aligned with an aperture 89 to lock the sleeve 86 to pilot extension 87. Thus, by unscrewing the set screw 93 out beyond the outer diameter of the sleeve 86, the ring nut 92 may be rotated to different axial positions along the sleeve 86, and then when the screw 93 is aligned with one of the apertures 89 it may be screwed into position to clamp the nut 92 and thus the sleeve 86 to the pilot extension 87 and thus limit the upward axial motion of the grinder 20.

The lower end of sleeve 86 is provided with an outwardly extending flange or shoulder 94 which engages a corresponding flange or shoulder 95 on a force feed control nut 96 which cooperates with the enlarged threaded upper end 97 of sleeve 84. When the nut 96 is unscrewed so that its upper surface abuts against the ring nut 92, the clearance between the shoulders 94 and 95 is the distance which the grinder 20 may travel with respect to the pilot 50, and corresponds directly with the depth of cut which can be made by the grinding tool 22. Thus by pre-setting the distance between ring nut 92 and shoulder 94, the downward axial motion of the tool 20 or the depth of the cut or grind may be predetermined. The nut 96 is of the split type and is provided with a surrounding spring ring 98 to insure a tight fit between the threads, and prevent nut 96 from turning as a result of vibrations of the grinder.

Another form of force feed mechanism, which is manually applied, is shown in FIGS. 14 and 15, and comprises a freely rotating sleeve 99 fastened to the upper end of the pilot 50″ over which a cap 100 is threaded into socket 101 attached to housing 32 and sleeve 47 by threads 46. Thus when the cap 100 is locked to the freely rotating sleeve 99 on the upper end of pilot 50″ by means of set screw 102, positive rotation of the cap 100 by a wrench over its hexagonal top 103 will screw it in or out of socket 101 to positively move the grinding assembly 20 axially with respect to the fixed pilot 50″.

Instead of the force feed mechanism shown in detail in FIG. 12, the feed may be accomplished manually, or as illustrated by the mechanism in FIG. 16, in which a gravity feed means may be used in combination with the guide and gauge structures of the invention for controlling the depth of cut during the grinding operation. In FIG. 16, the depth and feed control sleeve nut 105 is externally threaded at 108 and has threaded engagement at 110 with the threads 46 of sleeve 47. The upper inner end of sleeve 105 is provided with feeding threads at 112 to engage the externally threaded and depending guide portion 114 of adjusting knob 115. A standard slotted end type set screw 117 in knob 115 adjustably locks a control rod 119 therein, the lower end of rod 119 providing a stop against which the upper end of the valve guide pilot 50′ abuts to determine and limit the depth of cut of the grinding wheel 22.

When such force feed means are utilized with the guide and gauge device having two depth rods as in FIGS. 1 and 2, the sleeve 105 in FIG. 16 may be adjustably positioned by a control nut 123 in depth bar 128 as in that form of the invention. It will also be understood that the control nut 123 and bar 128 are not required in the single depth rod form of the invention shown in FIGS. 14 and 15.

(II) The Guide and Depth Gauge

Referring again to FIGS. 1, 2 and 4, the sleeve 84 is externally threaded at 122 on which threads rides a depth adjustment nut 123 rotatably mounted in an aperture 127 (see FIG. 12) in a cross bar 128 of the guide and depth gauge attachment of this invention.

Adjacent the extremities of bar 128 are adjustably mounted depth or guide rods 130 slidingly positioned in vertical apertures 132. Each rod 130 may be provided with a longitudinal flat 134 against which a locking screw 135 in a threaded aperture 137 sets to hold the rod in adjusted position with respect to the cross bar 128. The ends of rods 130 are square with the longitudinal axes thereof to provide abutting surfaces or stops 139 which are engageable with stops, reference or gauging surfaces 140 provided on a dressing jig and on the cylinder block or work piece. Such reference or gauging surfaces or stops may also be provided on a fixture for positioning the work piece as later described in FIG. 18.

While in most instances two guide rods 130, one adjacent each end of bar 128, are sufficient to guide and gauge most grinders of the general type shown, the tripod arrangement shown in FIG. 3 may be used. The bar 128′ may have a transverse end portion 129, the outer ends of which are apertured to receive guide rods 130 to thus provide a gauge supported by three such rods. The rods 130 are spaced far enough apart to add materially to the stability of the guide.

Mounted on a side of housing 32 is a block 142 in which is fixed, by means such as screws 143, one end of a bar 145, the other end of which projects upwardly through a hole 147 in cross bar 128, the arrangement serving as a torque arrestor to prevent the tendency of the grinder 20 to twist due to torque created by the rotation of the grinding wheel spindle 21.

Referring now to FIGS. 14 and 15, a modified gauge and guide arrangement has been illustrated which utilizes a single adjustable depth or gauge rod 148 having an enlarged knurled head portion 149. The grinding head 20 is the same as that previously described but is provided with a bracket 150 secured to gear housing 32 by screws 151. The bracket 150 has a tubular vertically arranged rod receiving sleeve portion 152 disposed adjacent the housing 32 and internally threaded to engage the threaded portion 153 of rod 148. Tubular portion 152 is split longitudinally at 154 and provided with opposed ears 155 having aligned holes 156 therein, one of which is threaded, to receive a clamping screw 157 for locking the rod 148 in longitudinally adjusted position in the sleeve 152.

Where permissible, the socket type stop 159 may be utilized to guide the rod 148 during the grinding operation. For example, cylinder heads provided with valve seats frequently have apertures therein capable of receiving such a stop member 159 and the use thereof adds stability to the grinder.

As particularly shown in FIG. 18, a fixture 160 may be provided on which a gauging surface and/or sockets may be located to position the gauge and guide bar 128 for a grinder. The fixture 160 may be inclusive of a base 161 to which are fixed uprights 162 in turn mounting a plate 163 in spaced relation to the base 161. Within the space between the base 161 and plate 163 is a ram 164 capable of being raised and lowered by power means such as a hydraulic piston 165 in cylinder 166. The ram 164 may be provided with adjustable guides 167 by which a cylinder head or other work piece 26 may be located so as to position the work area such as valve seat adjacent an aperture 169 in plate 163 through which the grinding wheel of a grinder may pass to contact the work. Thus the upper surface of plate 163 may be the reference or gauging surface 140, or the plate may be apertured to receive the socket type stops 159 previously mentioned.

(III) Dresser

FIGS. 1, 2 and 17 illustrate a fixture indicated generally at 175 comprising a body portion 176 of rectangular block shape. Adjacent each end of body portion 176 is a vertical hole or aperture 178 within which is received a centrally grooved elongated shank end 179 of the cylindrical guided or socket type stop 159 having a reference or stop surface 181 provided by the bottom of a central aperture 182 in the member 159. This shank 179 may be held in place by a set screw 180 screwed into the groove in each shank. The surface 181 is parallel with the top surface 184 of the fixture 175 and the invention contemplates using a surface such as 184 for the reference or stop surface as will hereinafter appear. Projecting from block 176 are vertically spaced upper 186 and lower 187 extensions for receiving therebetween the cylindrical end 188 of a bracket arm 189, the extensions and arm having aligned holes for receiving a sleeve or guide 190, simulating a valve stem guide, for the pilot 50 or 50′ of grinder 20, and also held in place by a set screw 180 in a groove in said guide.

As particularly shown in FIG. 17, the outer end of arm 189 is provided with an angularly disposed channel portion 192 between the ways or guides 194 of which is adjustably mounted a dressing tool 196 having a bar 197 reciprocably positioned in a slide 198 and in which is mounted a diamond point or cutter 199 adapted to be moved across the cutting surface 23 of the wheel 22 to dress it by breaking up and sharpening the grinding particles as well as truing the surface to prepare the wheel for a succeeding grinding operation. To reciprocate bar 197, the lower edge thereof is provided with a toothed rack 200 meshing with a gear 202 on the inner end of crank 204. Interposed between channel 192 and slide 198 is quadrant 205 by which slide 198 may be angularly adjusted to thereby adjust the dressing angle of cutter 199. The tool 196 is located in a predetermined position relative to the stop surface 181 so that upon completion of the dressing operation the grinding surface may be adjusted to compensate for the amount of stone removed. So adjusted, the grinder 20 is moved to the work to perform the grinding operation.

Depth adjustment nut 123 is provided with a scale at 124 (see FIG. 13) which is graduated in degrees and in cooperation with a pointer 125 serves to gauge the amount dressed off of the grinding wheel during the dressing operation. Rotating nut 123 in aperture 127 in a counter clockwise direction as viewed in FIG. 13 serves to lower the grinder 20 and grinding wheel 22 with respect to the dressing tool 196 so that the cutter 199 can be operated to dress the cutting edge the amount desired to prepare same for the grinding operation.

The rods 130 may be adjusted with respect to bar 128 a distance equivalent to the amount of grinding wheel removed and indicated by the scale 124. Thus, the stop surfaces 139 are adjusted to maintain the same relative position to the grinding surface, so that the stops 139 limit or gauge the subsequent grinding operation.

The dressing fixture 210 shown in FIG. 14 is provided with a single socket type stop 159 having a shank portion 179 located in a vertical bore 211 spaced from the pilot guide 190. As in the previously described form of the invention, a dressing tool 196 is fixed adjacent the fixture 210 and has a reciprocable bar 197 in slide 198. A diamond point or cutter 199 is mounted in bar 197 to be moved across the cutting surface 23 of the wheel 22.

In use, the depth gauge of the present invention not only limits the depth of cut during grinding, but also guides and steadies the grinding machine during such operation as well as during its dressing operation. In the latter case, the gauge cooperates with the dressing fixture to support and locate the grinding machine and its grinding wheel in position to be accurately dressed a predetermined measured amount so that upon being transferred to the work, the grinding wheel is positioned in the same relative position adjacent the seat to be ground as it was after dressing. This is accomplished by adjusting the nut 123 in FIGS. 1, 2 and 4, or the rod end 149 in FIG. 14, a distance equivalent to the amount of grinding surface removed.

While there is described above the principles of this invention in connection with specific apparatus, it is to be clearly understood that this description is made only by way of example and not as a limitation to the scope of this invention.

What is claimed is:

1. A combination portable grinding machine and dresser therefor in which said grinding machine grinds a seat in a work piece having a first stop surface in definite relation to the seat to be ground, said machine having a rotary grinding wheel axially movable into engagement with the seat, said dresser having a dressing tool for said grinding wheel and a second stop surface having the same fixed relation with respect to the dressing tool as said first stop surface is to said seat, means on said machine having a stop engageable with said stop surfaces for stabilizing and limiting the position of said grinding wheel so that its grinding surface is in the same relative position with respect to said stop during dressing and grinding operations, and means to adjust said stop on said machine to maintain said relative position to said grinding surface to compensate for change in the grinding surface after each dressing operation.

2. A combination grinding machine and dresser according to claim 1 wherein said stop means on said machine comprises at least one rod parallel to the axis of said machine.

3. A combination grinding machine and dresser according to claim 2 comprising two parallel rods on opposite sides of said rotary grinding wheel.

4. A combination grinding machine and dresser according to claim 3 including three parallel rods forming a tripod around said axis of said machine.

5. A combination grinding machine and dresser according to claim 1 wherein said means to adjust said stop on said tool comprises a rotatable nut between said stop means and said machine.

6. A combination grinding machine and dresser according to claim 5 wherein said rotatable nut has micrometer calibrations thereon.

7. A combination portable grinder and dresser therefor, comprising: a grinding wheel rotating spindle for said grinding wheel, a housing for said spindle, a gauge and guide means for said grinding wheel attached to said housing including at least one stop means extending therefrom parallel to said spindle, said stop means having an abutting surface located a predetermined distance from the cutting surface of said grinding wheel, a cutting edge for dressing said grinding wheel, gauging surfaces for contact with said abutting surface of said stop means and for stabilizing said grinding wheel, said surfaces being located a fixed distance from the finished surface of the work to be ground and from the cutting edge of said dressing tool, and means to adjust said abutting surface of said stop to maintain the relative position of said grinding surface of said wheel to compensate for the change in said grinding surface caused by each dressing operation of said dressing tool.

8. A combination grinder and dresser according to claim 7 wherein said housing includes gear means for driving said grinding wheel.

9. A combination grinder and dresser according to claim 7 including a flexible shaft connected to said housing for rotating said spindle.

10. A combination grinder and dresser according to claim 7 including a plurality of said stop means.

11. A combination grinder and dresser according to claim 7 wherein said gauging surfaces are located at the bottom of sockets, and wherein said stop means comprises a rod which fits into said sockets the end of said rod having said abutting surface.

12. A combination grinder and dresser according to claim 7 wherein said adjustable means comprises a screw threaded device connected between said stop means and said tool.

13. A combination grinder and dresser according to claim 7 wherein said gauging surfaces are located on a fixture for the work to be ground by said tool.

14. A combination portable grinding machine and a dressing tool therefor, in which said grinding machine grinds a seat in a work piece having a stop surface in definite relation to a seat therein to be ground, said machine having a rotary grinding wheel movable into engagement with the seat, stop means on said machine for engagement with the stop surface on said work piece when the grinding operation has been completed, said stop means being initially spaced from said stop surface a distance equivalent to the amount of seat to be removed by said grinding wheel, said dressing tool for said grinding wheel including a dressing means and a fixture having a stop surface, said dressing means having a fixed relation with respect to said fixture stop surface, said stop means engaging said fixture stop surface during the dressing operation, means to gauge the amount of material removed from the grinding wheel during dressing to compensate for the change in said grinding wheel so that said grinding wheel maintains its relative position with respect to said stop surface adjacent said seat on said work piece.

15. A combination grinding machine and dressing tool according to claim 14 wherein each of said stop surfaces on said work and adjacent said fixture include sockets for guiding said stop means.

16. A combination portable grinder and dresser therefor, in which said grinder grinds a seat in a work piece having a first stop surface located a fixed distance from the finished seat in the work piece to be ground; said grinder having a rotary grinding wheel movable into engagement with said seat, stop means on said machine engageable with said first stop surface for limiting the amount of seat to be removed by said grinding wheel, said dresser having a dressing tool for dressing said grinding wheel, a second stop surface located at the same distance from said dressing tool as said first stop surface is from said seat, said stop means also being engageable with said second stop surface for locating said grinding wheel with respect to said dressing tool, and means to adjust said stop means to compensate for the change in the grinding surface after dressing to maintain the relative position of said stop means with respect to both stop surfaces.

References Cited in the file of this patent

UNITED STATES PATENTS

| | | |
|---|---|---|
| Re. 17,313 | Davis | June 4, 1929 |
| 804,869 | Michell | Nov. 21, 1905 |
| 1,244,703 | Clark | Oct. 30, 1917 |
| 1,274,425 | Kytlica | Aug. 6, 1918 |
| 1,635,463 | Davis | July 12, 1927 |
| 1,699,475 | Miller | Jan. 15, 1929 |
| 1,987,812 | Albertson | Jan. 15, 1935 |
| 1,999,435 | Alberston | Apr. 30, 1935 |
| 2,400,160 | Mizell | May 14, 1946 |
| 2,416,247 | Wilcox | Feb. 18, 1947 |
| 2,832,329 | Newbould | Apr. 29, 1958 |
| 2,894,504 | Tintinger | July 14, 1959 |
| 2,977,727 | Gray et al. | Apr. 4, 1961 |

FOREIGN PATENTS

| | | |
|---|---|---|
| 734,269 | Great Britain | July 27, 1955 |
| 845,783 | France | May 22, 1939 |